March 20, 1934. A. H. WARTH Re. 19,117

PROCESS OF PRODUCING CLOSURES

Original Filed Jan. 7, 1927

Inventor

Albin H. Warth.

By Cushman Bryant & Cady

Attorneys

Reissued Mar. 20, 1934

Re. 19,117

UNITED STATES PATENT OFFICE 19,117

PROCESS OF PRODUCING CLOSURES

Albin H. Warth, Baltimore, Md., assignor, by mesne assignments, to Crown Cork & Seal Company, Inc., New York, N. Y., a corporation of New York Original No. 1,788,260, dated January 6, 1931, Serial No. 159,743, January 7, 1927. Application for reissue January 23, 1934. Serial No. 707,995

4 Claims. (Cl. 113—80)

This invention relates to a method of producing closures of the type in which a sealing disc has a metal foil facing. This type of closure is characterized by the provision, upon the interior cushion or sealing disc, of a facing or spot having a surface which protects the cushion material from the liquids and gases.

Closures of the well known crown cork type comprise a metal shell having a skirt and a resilient sealing disc usually made of cork. For some uses, the sealing discs are given a non-absorbent, gas impervious and acid resistant facing of metal foil, e. g. tin foil, or aluminum foil. Aluminum foil is characterized by the fact that it is substantially non-absorbent and gas impervious, and for this reason the same and other materials having similar characteristics are used to form facing disc or spots upon the cushion material of crown caps. Ordinarily this facing is of smaller diameter than the cork discs and such crowns are known in the trade as spot center crowns.

These spot center crowns have been produced in various ways. According to one method a slot or groove is cut in the cork disc and the spot is given an inturned rim which is inserted in the slot. This method is objectionable because of its expense and because the spots are apt to drop out. According to another method the spots are pasted to the cork discs by a casein paste or a glue. In crowns so made the spots tend to loosen as the paste or glue is attacked by the packaged liquids. Furthermore, such method involves difficulties in handling and in applying the paste or glue. According to still another method the spots are secured by an underlying tissue of gutta percha or coated paper. In crowns so made, like objections are met with. For example, one difficulty in applying discs made from separate strips, such as gas and acid resistant material and the adhesive tissue strips, has arisen from the necessity for feeding the two strips to the punching and assembly machine. There is not only difficulty in feeding the strips, but in cutting the separate tissue strip with a clean, sharp edge so as to insure the binding stratum of adhesive being coextensive in area with the disc of liquid resistant material. As will be understood, the adhesive stratum is intended to act not only as a cement, but also as a waterproof, non-absorbent, gas impervious medium for avoiding the possibility of the contents of a bottle getting between the facing disc and the material of the cap, either the metal shelf itself or a cushion disc of cork or composition cork.

Furthermore, when using superimposed strips of the facing material and of adhesive tissue, it was essential, to bond the adhesive tissue to both the material of the cushion disc in the cap and the facing material.

In preparing the rolls of facing material and adhesive tissue, the practice usually followed was to form a roll of the tissue in strips of the desired width, and to unwind this roll and a roll of the facing material while feeding the two strips one over the other into the disc forming and assembling machine. This is a troublesome and expensive operation, because of the frequent breakage of the adhesive tissue and the necessity for using fairly heavy tissue to minimize this tendency. This is due partly to the fact that the facing material was substantiallly non-elastic, while the adhesive tissue possessed a certain degree of elasticity, thus introducing a factor of difficulty in securing a uniform paying of both the facing strip and the gutta percha tissue strip.

It is desirable, in the use of facing discs of the character above referred to, that the adhesive stratum be as thin as possible, and yet be continuous throughout the entire area of the facing disc, and particularly that it be uninterrupted about the edge of this disc, since at this point the disc should be firmly bonded so as to effectively seal the joint about the edge of the facing disc. When cutting and applying the discs of material and adhesive, there is no means of ascertaining whether the desired conditions are present in the completed cap. Consequently, there is always likelihood of imperfectly faced caps being produced.

With the above conditions in mind, I have provided material, in strip form, for facing bottle caps, in which one surface of the strip is provided with a firmly adherent, continuous thin facing of adhesive, thus avoiding all necessity for assembling strips of facing material and of adhesive tissue preparatory to their use in the bottle cap facing machine, and all of the disadvantages growing out of this practice.

In the strip material of my invention, a very thin stratum of adhesive is evenly distributed upon one face of a strip of facing material. The adhesive is not only firmly bonded to this material, but has a smooth surface finish of sufficient thickness to form the desired firm bond between a disc cut from the strip and the material of the cap to which such disc is cemented.

Furthermore, adhesive tissue must be of a thickness to have sufficient inherent strength to permit of its being stripped from a roll in a mill for working same, and to admit of its being cut to the desired width and to be handled in the winding and the disc applying machines, and during the process of its production it has more or less of a longitudinally extending grain, as distinguished from its normal granular formation.

In the application of heat, when bonding the facing material to the cap, when utilizing adhesive tissue, a tendency of the adhesive is to break up into slightly isolated, small globules, thus interrupting the continuity of the bonding stratum. Whether this is due to irregularities in the surface of the facing strip, or to a shrinkage of the adhesive tissue when fused, I have been unable to determine. In the strip of my invention, however, the adhesive is thoroughly distributed throughout one face of the facing material, and the above conditions do not develop in the subsequent handling of the strips.

It is an object of the present invention to provide a method of producing spot center crowns such that the spots are easily and economically secured to the sealing discs and such that they are firmly secured and not liable to become loosened in use.

With these general objects in view the invention consists in the method which will be first described and then more particularly pointed out in the claims.

According to the method of the present invention, the strip material having a surface which is substantially non-absorbent and gas impervious, such as metal foil, is coated with a substance that is devoid of tackiness when dry and has adhesive qualities when soft. In carrying out the method according to what is considered the best practice the adhesive substance is such that it can be applied cold, i. e. at room temperatures, and is waterproof or insoluble in cold water. While various materials may be used I have found a suitable adhesive in a solution of dammar gum and rosin in mineral spirit or turpentine, to which is added 5% or less of a vegetable oil such as soya bean or China-wood oil. The dammar gum and rosin may be in the proportion of 35% to the whole. The adhesive may have a drier of lead resinate or the like in a proportion of 2% or less. This adhesive is waterproof and is not weakened by gases or acids, such as are present in the bottle contents with which crown caps are usually employed.

While the coating may be applied to the material in various ways, it is conveniently applied in fluid form and cold to a strip of foil from which the spots are to be cut. So far as the method of producing the strip is concerned, it is such that the effective distribution of the adhesive throughout the entire area of the facing material is assured, and this condition cannot be disturbed as a result of the cutting of discs from this material when in strip form. Furthermore, the adhesive surface may be thoroughly inspected while producing the strip material, so that any imperfect product may be discarded before it reaches the disc applying machine. In this connection it is noted that the spots may be conveniently assembled by feeding a strip of material over successive crown corks and cutting out a disc which is deposited on a cork, such assembling machinery being known in the art.

After the coating is applied to the metal foil it is dried. While this may be effected by air drying at room temperature it is more rapidly accomplished at a temperature of about 300° F. maintained for about 3 minutes. When dried the coating is devoid of tackiness so that the metal foil may be handled without difficulty or trouble. This is particularly advantageous when the metal foil is to be fed in strips because the application of the adhesive is carried out independently of the assembling steps. Moreover, the coating gives the thin metal foil more or less body which facilitates feeding and cutting. Since the adhesive is applied directly to the surface, of the facing or spot material and firmly bonded thereto, there is no likelihood of difficulties arising as a result of separation of the adhesives from the facing strip during the spot forming operation, either as a result of poor adherence or from suction or otherwise, such as frequently occurs when using superimposed strips of facing material and of adhesive tissue. Moreover, in handling this material the adhesive stratum is incapable of stretch or distortion relative to the spot strip as frequently occurs in the handling of separate strips of adhesive tissue and facing material where any stretch or distortion of the adhesive stratum results in a defective cap and when the stretch is extreme, tearing of the adhesive tissue makes necessary the stoppage of the cap machine until the strip can be repaired.

After the coating is dry, the metal foil spots are assembled, coated side down, with the sealing discs. In case the metal foil is fed in a strip, spots may be cut out and deposited on the sealing disc, as above set forth.

At the time of assembly the coating material is softened to render it adhesive and the assembled unit is subjected to pressure. In carrying out the invention according to what is now considered the best practice the coating will be softened by heat after the crown is assembled. In cutting discs from this improved laminated strip having an adhesive stratum bonded thereto, there is no tendency toward mutilation of the adhesive layer by reason of possible drag of the cutting dies, and each disc, as delivered from the die to within a cap, will present a continuous uninterrupted adhesive surface upon the disc so as to insure, by the subsequent application of heat and pressure, a bond between the disc and the cap cushion layer coextensive in area with the disc.

This possibility of securing a clean cut by the dies for forming the discs, both as to the non-absorptive and gas impervious, and as to the adhesive stratum, insures an effective bond entirely about the edge of the spot or disc, thereby presenting a continuous barrier of non-absorptive and gas impervious material at the space between the disc and the cap which will effectively prevent the seepage of gas or fluid in a bottle between the disc and the portion of the cap to which it is applied.

Although the adhesive facing is sufficiently thick to provide an adhesive stratum or layer, it is sufficiently thin to avoid any tendency toward the expression during the application of pressure of any of the adhesive from between the facing material and the portion of the cap to which it is applied. This may be accomplished in any suitable manner, as by a heated plunger or a plunger and heated table. The heat softens the coating and renders it adhesive and the pressure serves to unite the metal foil spot to the cork.

Referring to the accompanying drawing, there is shown suitable mechanism for coating the strip and for cutting discs therefrom and adhesively uniting the disc to caps at the time of the assembly of the discs with the caps. In the drawing, Figure 1 is a diagrammatical view showing the coating of the strip.

Figure 1:
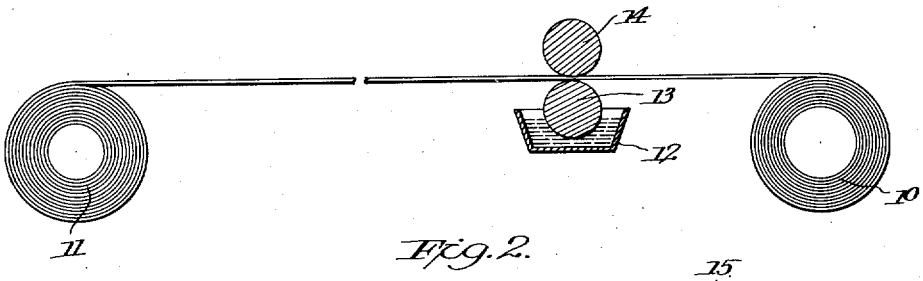

The strip of facing material should have the characteristic of aluminum foil. That is to say, it should present one surface which is non-absorbent and gas impervious. This strip may be fed from a reel 10 to a reel 11, suitably separated so that the adhesive coating may be applied and hardened between the time any portion of the strip leaves the reel 10 and is wound upon the reel 11. For the purpose of applying the adhesive, the same may be maintained in a trough 12, positioned beneath an adhesive applying roll 13, between which and a roll 14, the strip passes, so that as the rolls are rotated the adhesive is applied to the undersurface thereof. As will be understood, the adhesive hardens between the time it is applied and the winding of the laminated strip upon the reel 11.

Figure 2:
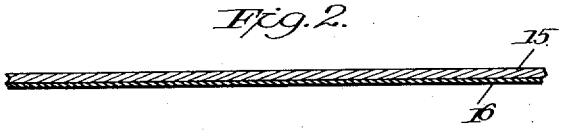
Figure 2 is a longitudinal sectional view of a fragment of the strip.

The completed spot material or liner is illustrated in Figure 2, and comprises the layer 15 of non-absorbent and gas impervious material, such as aluminum foil having on one surface the coating 16 of adhesive, which is preferably of the character hereinbefore described. This adhesive is waterproof or liquid resistant, and will be normally hard, i. e. non-tacky, at room temperature so that the material may be conveniently handled in strip form, but quickly softens under the application of heat, becoming tacky, so that upon the application of pressure, the laminated disc will be adhesively retained in the cap. The preferred method of applying the material to the cap is to utilize, at the time of assembly, both heat and pressure to unite the spot to the cork or cushion material insert or facing of the cap.

Figure 3:
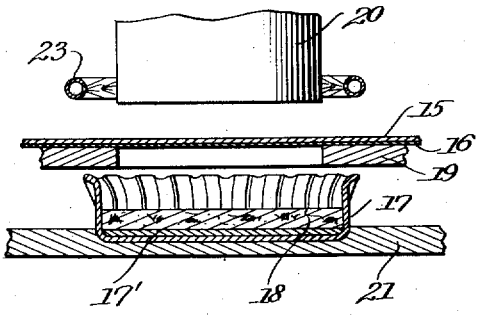
Figure 3 is a side elevational view partly in section showing one step in the assembly operation.
Figure 4:
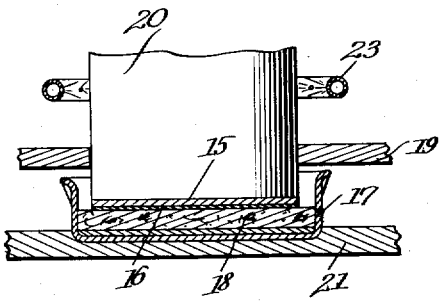
Figure 4 is a view similar to Figure 3 showing the spot as it is cut and adhesively united to the cap at the time of assembly.

In Figures 3 and 4, there is shown a suitable mechanism for applying the disc and adhesively uniting it to the cork insert at the time the strip is punched from the disc and assembled with the cap.

The cap 17 is of the conventional crown type having an interior facing 18 of cushion material, such as composition cork retained in the cap as by an adhesive layer 17′; the cushion disc and adhesive may be applied to the cap in any suitable manner, for example, as described in the patent to Marsa, No. 1,603,786, granted Oct. 19, 1926. The caps, with the cushion discs inserted therein, may be positioned beneath the cutting dies 19, 20, by means of a traveling bed 21 having suitable sockets for receiving the cap so as to position the same accurately beneath the cutting dies. The strip material for forming the spot is fed beneath the die 20 with the adhesive coating 16 facing the cap, and when the die descends it will cut from the strip, which is fed by any suitable means (not shown), a spot or facing 22 of the character illustrated in Figures 5 and 6. The spot or disc is preferably of smaller diameter than the cap facing so as to form a substantially centrally disposed spot which leaves around its edge an exposed portion of the cushion material adapted to engage the edge of a bottle neck, the spot being of sufficient size to close the bottle mouth and prevent contact of the contents with the cushion material.

Figure 5:
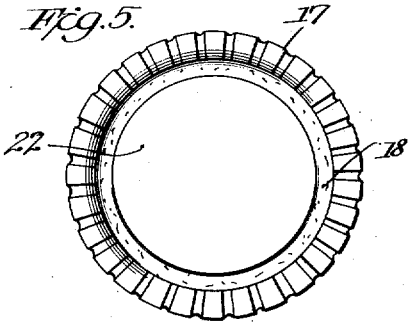
Figure 5 is an interior face view of the completed cap.
Figure 6:
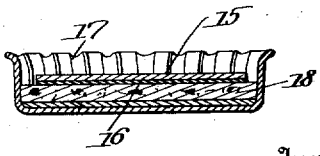
Figure 6 is a cross sectional view of the cap shown in Figure 5.

As will be observed (Figures 3 and 4) as the punch 20 descends, it cuts from the strip a spot of the size shown in Figure 5, and continued downward movement presses this disc upon the cushion layer 18.

The punch 20 may be maintained at an elevated temperature, as by means of a burner 23, and the temperature should be sufficient to fuse or soften the adhesive coating and make it tacky so that, at the time the disc is assembled with the cap, the heat and pressure will cause the disc to be adhesively united to the surface of the cushion material with sufficient permanency to insure that the position will be retained and avoid likelihood of displacement of the disc thereafter.

The assembled unit is then permitted to cool and the cooling may advantageously be coupled with pressure, for example, by a plunger. Cooling may be effected in any suitable manner, being carried out to the congealing point of the coating material.

The resulting crown has a firmly secured metal foil spot which is not liable to become loose in use owing to the fact that the adhesive substance is not soluble in liquids more commonly sealed by crown corks. Moreover, when the metal foil is assembled with the sealing disc it is already prepared for being stuck in place, the sticking being accomplished by the simple application of heat and pressure. The coating operation is a simple one and the coated metal foil is easily handled because the dry coating is not tacky.

A cap made in accordance with this method possesses the advantage of a substantially uniform and complete distribution of the adhesive layer throughout each spot or facing disc. The method has the advantage of eliminating the labor of associating a separate adhesive strip and a strip of facing material, and the further advantage of enabling higher speeds to be maintained in the facing spot applying machine. The elimination of the danger of breakage of a separate adhesive tissue strip avoids the frequent stoppage of the machine, which was unavoidable due to the handling of the somewhat fragile and elastic adhesive tissue.

What is claimed is:

1. The improved method of manufacturing caps of the type having an interior disc of cushion material provided on its exposed face with a center spot, which comprises providing spot material in strip form having one surface formed of an exposed continuous coating of water resistant adhesive which is normally hard at room temperature but becomes tacky upon the application of heat and having another surface to be exposed to the contents of a capped container, cutting from said strip a facing spot having one surface completely coated with said adhesive with a cap disposed beneath the portion of the strip from which the spot is cut, whereby the cutting operation positions the spot upon the cushion material with the coating between the spot and the cushion material, and upon assembly applying simultaneously to the spot pressure and sufficient heat to render the adhesive tacky, thereby causing the spot to adhere to the cushion material, and thereafter permitting the adhesive to cool and harden.

2. The improved method of manufacturing caps of the type having an interior disc of cushion material provided on its exposed face with a center spot, which comprises providing metal foil spot material in strip form having one surface formed of an exposed continuous coating of water resistant adhesive which is normally hard at room temperature but becomes tacky upon the application of heat and having another surface to be exposed to the contents of a capped container, cutting from said metal foil strip a facing spot having one surface completely coated with said adhesive with a cap disposed beneath the portion of the strip from which the spot is cut, whereby the cutting operation positions the spot upon the cushion material with the coating between the spot and the cushion material, and upon assembly applying simultaneously to the spot pressure and sufficient heat to render the adhesive tacky, thereby causing the spot to adhere to the cushion material, and thereafter permitting the adhesive to cool and harden.

3. The improved method of manufacturing caps of the type having an interior disc of cushion material provided on its exposed face with a center spot, which comprises providing spot material in strip form having one surface formed of an exposed continuous coating of water resistant adhesive which is normally hard at room temperature but becomes tacky upon the application of heat and having another surface to be exposed to the contents of a capped container, cutting from said strip a facing spot having one surface completely coated with said adhesive with a cap disposed beneath the portion of the strip from which the spot is cut, whereby the cutting operation positions the spot upon the cushion material with the coating between the spot and the cushion material, and upon assembly applying simultaneously to the spot pressure and sufficient heat to render the adhesive tacky, thereby causing the spot to adhere to the cushion material and thereafter permitting the adhesive to cool and harden while subjecting the assembled unit to pressure.

4. The improved method of manufacturing caps of the type having an interior disc of cushion material provided on its exposed face with a center spot, which comprises providing metal foil spot material in strip form having one surface formed of an exposed continuous coating of water resistant adhesive which is normally hard at room temperature but becomes tacky upon the application of heat and having another surface to be exposed to the contents of a capped container, cutting from said metal foil strip a facing spot having one surface completely coated with said adhesive with a cap disposed beneath the portion of the strip from which the spot is cut, whereby the cutting operation positions the spot upon the cushion material with the coating between the spot and the cushion material, and upon assembly applying simultaneously to the spot pressure and sufficient heat to render the adhesive tacky, thereby causing the spot to adhere to the cushion material, and thereafter permitting the adhesive to cool and harden while subjecting the assembled unit to pressure.

ALBIN H. WARTH.